US008938555B2

(12) United States Patent
Bush

(10) Patent No.: US 8,938,555 B2
(45) Date of Patent: *Jan. 20, 2015

(54) NON-BLOCKING BUFFERED INTER-MACHINE DATA TRANSFER WITH ACKNOWLEDGMENT

(71) Applicant: Microsoft Corporation, Redmond, WA (US)

(72) Inventor: Eric N. Bush, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/911,693

(22) Filed: Jun. 6, 2013

(65) Prior Publication Data

US 2013/0268647 A1 Oct. 10, 2013

Related U.S. Application Data

(63) Continuation of application No. 11/509,438, filed on Aug. 23, 2006, now Pat. No. 8,463,937, which is a continuation of application No. 10/396,870, filed on Mar. 24, 2003, now Pat. No. 7,103,890.

(51) Int. Cl.
*G06F 15/173* (2006.01)
*H04L 29/08* (2006.01)
*G06F 9/54* (2006.01)

(52) U.S. Cl.
CPC .............. *H04L 67/32* (2013.01); *G06F 9/544* (2013.01)
USPC ............ 709/238; 709/203; 719/101; 719/318

(58) Field of Classification Search
CPC .......... H04L 67/32; H04L 29/08; G06F 9/544

USPC .................. 709/203, 238–242; 719/318, 101
See application file for complete search history.

(56) References Cited

U.S. PATENT DOCUMENTS 5,835,763 A 11/1998 Klein
6,742,015 B1 5/2004 Bowman-Amuah
(Continued)

OTHER PUBLICATIONS

Notice of Allowance dated Jun. 20, 2006 cited in U.S. Appl. No. 10/396,870.
(Continued)

*Primary Examiner* — Phuoc Nguyen
(74) *Attorney, Agent, or Firm* — Jim Sfekas; Alin Corie; Micky Minhas

(57) ABSTRACT

A system, method and data structures for transmitting batched data over a network in asynchronous, non-blocking operations, with acknowledgements returned to the senders. Each machine includes a sender subsystem and a receiver subsystem. Transmission items corresponding to data to be sent are buffered until a send is triggered, at which time the transmission items are sorted according to their destinations and sent as a GUID-identified batch to each destination by a send thread. At each receiver, a receiving thread adds descriptions of the data to a receive list, which a transfer thread processes when triggered. The transfer thread sends the corresponding data to a recipient program, and sends GUID-identified acknowledgements corresponding to each GUID back to the originating senders. An acknowledge thread at each originating sender buffers the acknowledgements, and when triggered, a cleanup thread uses the GUID to identify which batched transmissions were received.

12 Claims, 10 Drawing Sheets

(56) References Cited

U.S. PATENT DOCUMENTS

| | | | |
|---|---|---|---|
| 6,817,018 B1 | 11/2004 | Clarke | |
| 6,928,442 B2* | 8/2005 | Farber et al. | 709/219 |
| 2002/0016827 A1 | 2/2002 | McCabe | |
| 2002/0133561 A1 | 9/2002 | O'Brien | |
| 2002/0173997 A1* | 11/2002 | Menard et al. | 705/7 |
| 2003/0041095 A1 | 2/2003 | Konda | |

OTHER PUBLICATIONS

Office Action dated Apr. 10, 2009 cited in U.S. Appl. No. 11/509,438.

Office Action dated Nov. 12, 2009 cited in U.S. Appl. No. 11/509,438.

Notice of Allowance dated Feb. 12, 2013 cited in U.S. Appl. No. 11/509,438.

\* cited by examiner

NON-BLOCKING BUFFERED INTER-MACHINE DATA TRANSFER WITH ACKNOWLEDGMENT

CROSS-REFERENCE TO RELATED APPLICATIONS

This application is a continuation of U.S. patent application Ser. No. 11/509,438, filed on Aug. 23, 2006, entitled "NON-BLOCKING BUFFERED INTER-MACHINE DATA TRANSFER WITH ACKNOWLEDGMENT," which issued as U.S. Pat. No. 8,463,937 on Jun. 11, 2013, and which is a continuation of U.S. patent application Ser. No. 10/396,870, filed Mar. 24, 2003, entitled "NON-BLOCKING BUFFERED INTER-MACHINE DATA TRANSFER WITH ACKNOWLEDGEMENT," and which issued as U.S. Pat. No. 7,103,890 on Sep. 5, 2006, both of which are incorporated herein by reference in their entireties.

FIELD OF THE INVENTION

The invention relates generally to computer systems and networks, and more particularly to network data transmission.

BACKGROUND OF THE INVENTION

Application and other component (e.g., driver) developers often treat data transmission as a relatively simplistic operation. Most do not employ any means of data queuing or asynchronous delivery. For example, a typical way in which data transmission (that is guaranteed to be delivered) is handled is to send the data from a source to a transmission-related component via a function call, and then block the function call, waiting for an acknowledgement that the data was received at the destination. If successfully received, the source transmission function returns the acknowledgement, and the source unblocks. If no return acknowledgement is received, the source may time out, and will handle the lack of acknowledgement as a failure in some manner, e.g., re-transmit the data for some number of times, or return an error. The source side blocking is made even longer by the receiver side delaying their return from the receiving function. Instead of queuing on the receive side, the receiver might perform some computations with the received data before returning, thus delaying the acknowledgement.

While such a data transmission operation (and others like it) work fairly well, blocking is not desirable, since it prevents other work from being done, and does not make full use of the data channel. One way to avoid blocking is to send transmissions without requiring an acknowledgement, however those transmissions are not known to have arrived at the destination, and are thus inappropriate for many types of data transmissions.

Moreover, problems arise when networks have thousands of machines, with substantial numbers of transmissions flowing both ways. For example, in a large network with many events, alerts and performance monitoring data that needs to be transmitted, along with conventional network traffic to handle web page serving, file serving, web services, and so forth, existing methods of data transmission can only scale to networks having machines numbering in the hundreds. Existing data transmission methods simply do not work for networks with machines on the order of thousands. Instead, various sets of machines (e.g., three hundred or so) have to be grouped together, with each set managed by its own managing server. As can be appreciated, having to purchase and maintain so many managing servers is highly undesirable, e.g., for a network of 20000 computers, between sixty and seventy managing servers would be needed, each handling a set of around 300 computers.

What is needed is an improved communication method, system and protocol that scales to thousands of machines while operating in a non-blocking, asynchronous manner. At the same time, the communication should be such that transmitted data is accomplished with a notification provided to the sender to acknowledge that the transmitted data was successfully received.

SUMMARY OF THE INVENTION

Briefly, the present invention provides a system, method and data structures that implement an improved communication protocol and mechanisms for handling the transmission of data in a non-blocking manner, with asynchronous notifications returned to the senders to acknowledge that the data was successfully received. In general, the present invention batches many small transmissions together into a lesser number of larger transmissions, thereby scaling to large numbers of networked machines.

In one implementation, each machine (whether server, client or both) includes a sender subsystem and a receiver subsystem. The sender subsystem includes an outgoing queue having a buffer for data to be sent and an incoming queue for buffering acknowledgements. The receiver subsystem includes an incoming queue with a buffer for received data, and an outgoing queue for buffering and sending acknowledgements. Each queue enables the rapid acceptance of data, with a buffer for later moving the data in bulk, that is, data is sent out as a batch, directed towards each destination, and accepted at each destination in a batch.

Data can be added to the current outgoing buffer via a transmission request, e.g., submitted by any thread of a process. The data to be sent identifies the destination and the data to send, and a single transmission request can specify multiple destinations and/or multiple sets of data to send. In one implementation, the data to be sent is provided in transmission items, with each transmission item listing one or more destinations to send the data to, and listing one or more sets of data (e.g., identified by buffer pointers and sizes) to send. As the transmission items are submitted, they are added as an entry to a transmission item list (an array) of a currently active tracking element, and placed in a transmission item (queue) buffer, e.g., stored in the array.

Data transmission may be triggered by (a configurable) passage of time, priority, or by a threshold amount of data being achieved, (e.g., corresponding to a total size of data to be sent on the sender, or received, or possibly a number of acknowledgements to send back from the receiver). The times, sizes and other variables may be adjusted to tune a given network or a machine for better performance. Once triggered, the tracking element (queue buffer) closes by moving out of the active accumulation phase, with a new buffer made available to start accumulating subsequent data for the next send operation. In other words, once the time limit has passed or a size limit has been achieved, for example, the active transmission tracking list element is closed off and a new element is started to maintain subsequent transmission requests.

After triggering but before sending, the data to be sent is processed so as to sort (split) the data by destination. To track the data per destination, the tracking element (e.g., of a send thread) creates a data item destination list that corresponds to per-destination data items constructed from the transmission items. For tracking purposes, a GUID (globally unique identifier, or like identifier that is unique to at least the network) is assigned by the send thread to each per-destination transmission. The GUID will be later returned with the acknowledgment, and used to free up the appropriate data and data structures, once the data has been acknowledged as having been received. When the data is split by destination into sets of data items to send, each set is sent out on the socket to its destination.

The receiver receives the data items off its socket, and immediately (e.g., via a receive thread) places each item in a currently-active receiving element of a receive queue, or list. The GUIDs are placed in one list, while the data items are listed in a parallel list. Once a configurable amount of time has passed (or some size threshold achieved, such as the amount of data in the queue), the current receive list element is closed off, and a new receive list element started for subsequently received data. The data corresponding to the closed-off list's data items are passed to a receiving application program by a transfer thread, and the list of acknowledgement GUIDs is used to send back acknowledgements to their destination origins. To reduce the number of acknowledgement transmissions, the GUIDs may be similarly grouped (batched) by their origin.

When an acknowledgement transmission is returned by the receiver and received at the original sender, the transmissions' one or more acknowledgement GUIDs are placed into an acknowledgement list element (queue), e.g., by a separate acknowledge thread, for later processing by a clean-up thread. When a configurable time limit or size (e.g., received data and/or number of acknowledgements) limit has been achieved, the current active acknowledgement list element is closed off, and a new current active acknowledgement list started. The closed-off list is used by a clean-up thread to search back into the transmission tracking element to mark destinations as having been successfully sent, and accordingly free up the data structures, as well as notify the program that provided the initial request so that the program can free up its data as desired. Any data that is not acknowledged as having been successfully received is dealt with in another manner, e.g., re-sent after a configurable amount of time up to some number of times until successful, or determined to be an error and subject to garbage collection.

Other advantages will become apparent from the following detailed description when taken in conjunction with the drawings, in which:

DETAILED DESCRIPTION OF THE PREFERRED EMBODIMENTS

Exemplary Operating Environment

Figure 1:
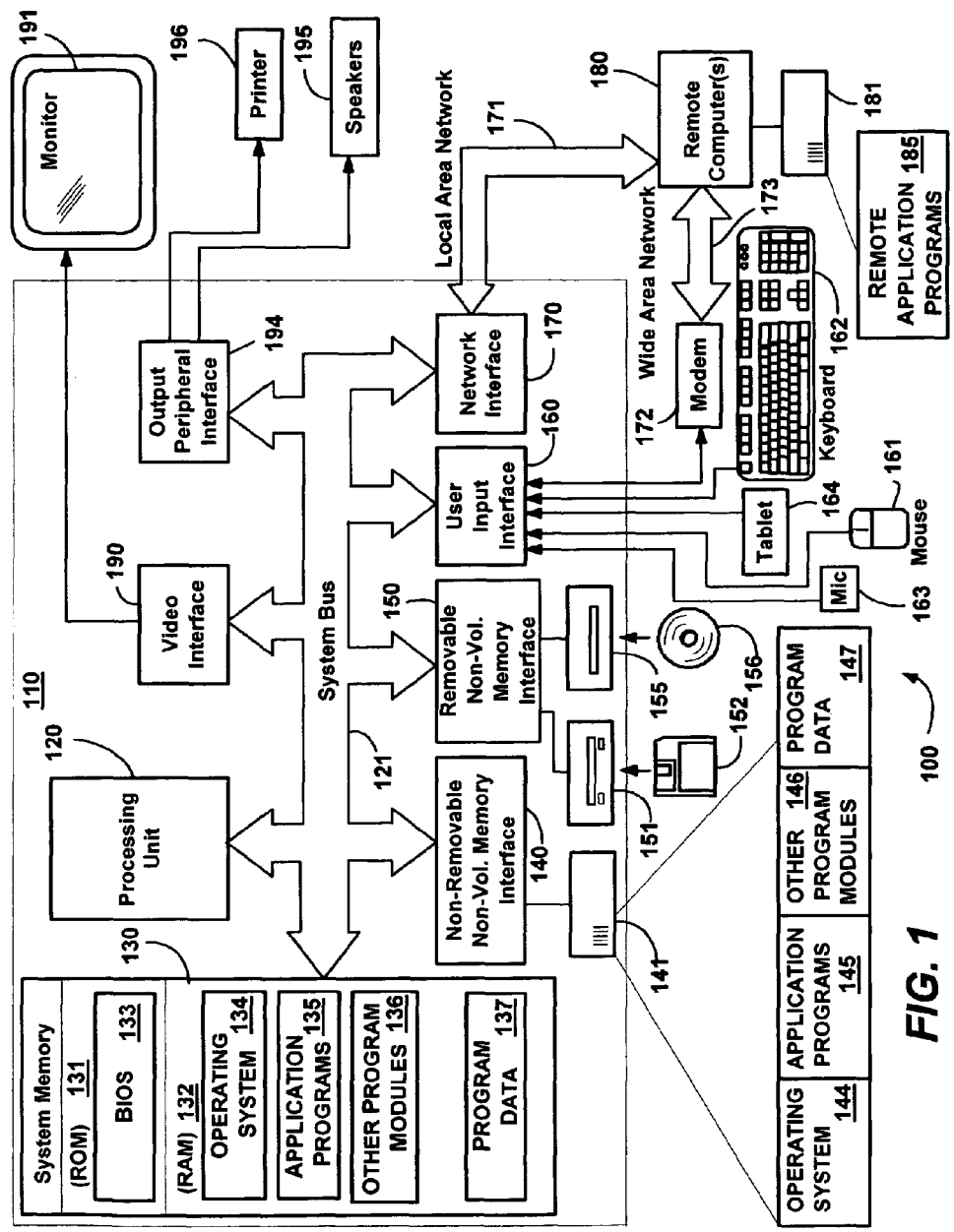
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Non-Blocking Buffered Inter-Machine Data Transfer With Acknowledgment

The present invention is, in part, directed towards large networks wherein significant numbers of data transmission requests are made. As will be understood, however, the present invention is not limited to any particular size, type or configuration of network, but rather provides significant advantages and benefits in virtually any computing environment needing data communication. Further, the present invention is described as being an operating system component which receives calls (e.g., through an application programming interface layer) from at least one application program. However, it should be understood that the present invention may be implemented at virtually any level of a computer system, such as in an application program, incorporated into a low level operating system driver just above the networking hardware, or essentially anywhere in between.

Figure 2:
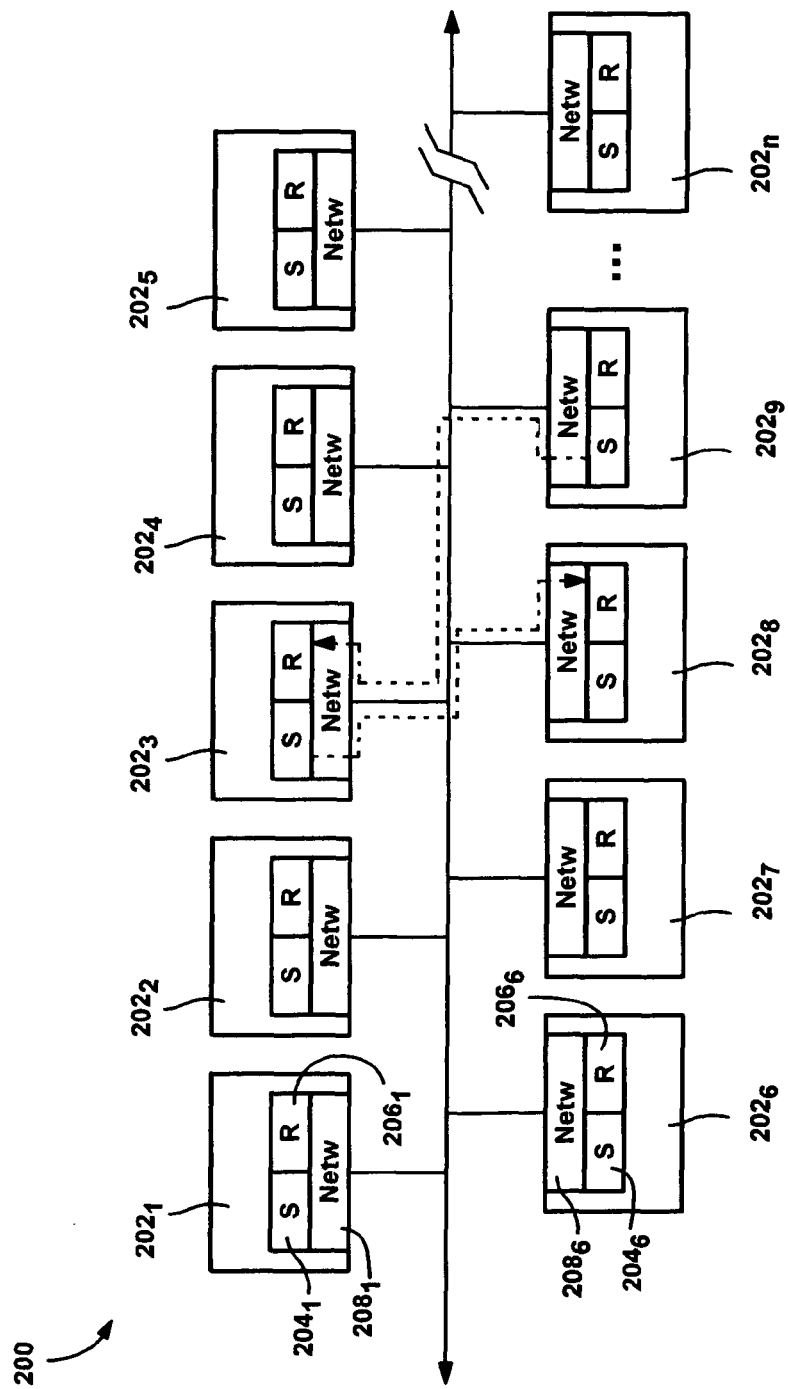
FIG. 2 is a block diagram generally representing a network into which the present invention may be incorporated.

Turning to FIG. 2 of the drawings, there is provided an example representation of a network 200 having an arbitrary number of computing machines 202.sub.1-202.sub.n. In practice, with the present invention, networks have been implemented that successfully accomplish needed inter-machine data transfer with machines numbering on the order of five or even ten thousand, given contemporary computing devices and contemporary transmission media. Notwithstanding, no actual upper limit of the number of machines has been determined.

In accordance with an aspect of the present invention, each machine is arranged with a sender subsystem (S) (e.g., 204.sub.1), and a receiver subsystem (R) (e.g., 206.sub.1), that operate at some level above network transport components (Netw) (e.g., 208.sub.1). Note that for clarity in FIG. 2, only the machines labeled 202.sub.1 and 202.sub.6 have their sender subsystem (S), receiving sender subsystem (R) and networking components (Netw) numerically labeled, (204.sub.1, 206.sub.1 and 208.sub.1 and 204.sub.6, 206.sub.6 and 208.sub.6), however it is understood that each machine communicating according to the present invention has like components. As also represented in FIG. 2 by the dashed lines, the machine 202.sub.3 is sending a transmission to the machine 202.sub.8, and (e.g., shortly thereafter) is receiving a transmission from the machine 202.sub.9.

Figure 3:
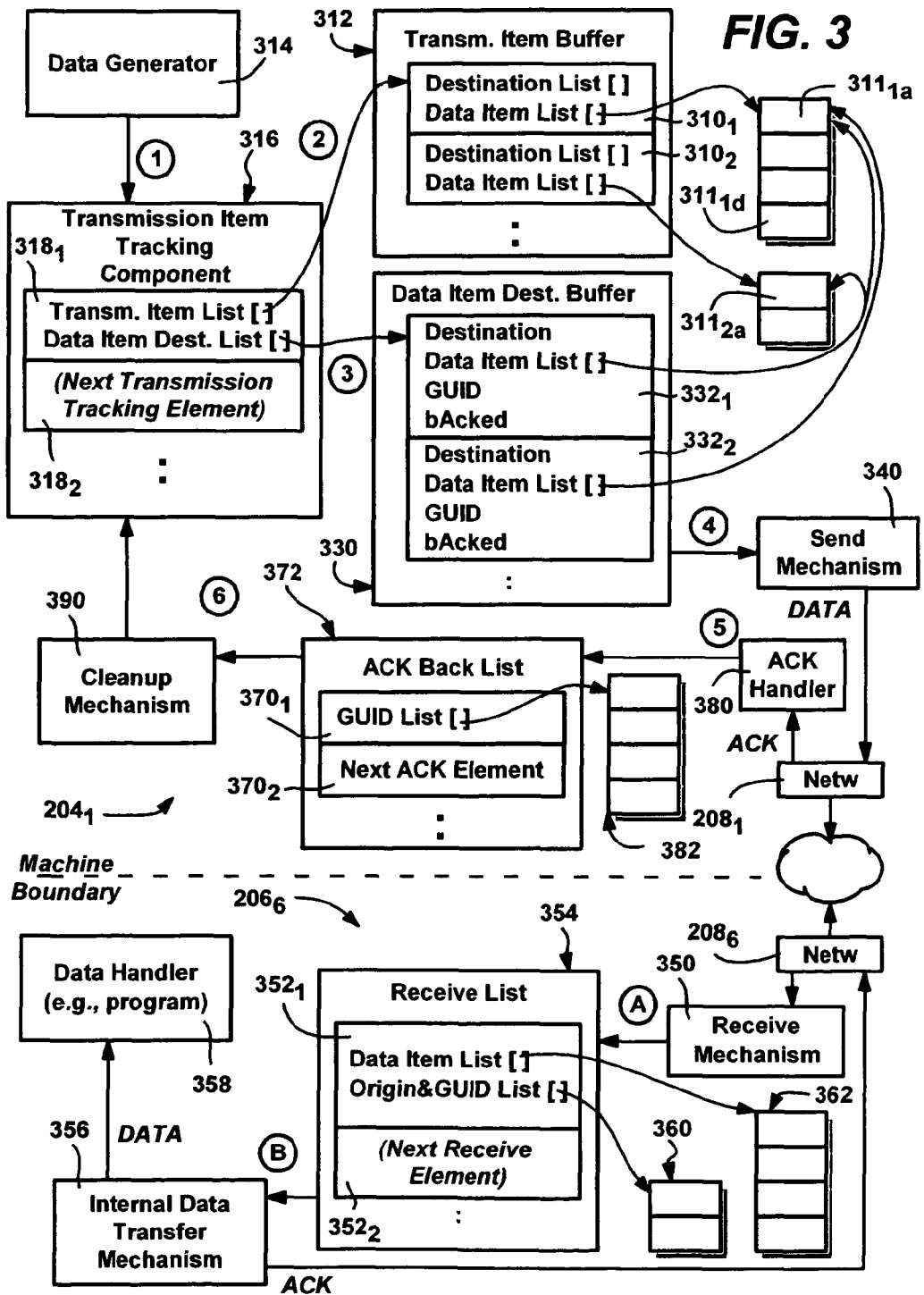
FIG. 3 is a block diagram generally representing a data sender and a data receiver configured in accordance with an aspect of the present invention.

FIG. 3 exemplifies the general flow of data between the send and receive mechanisms of two machines, a source machine and a destination machine, (e.g., the machines 202.sub.1 and 202.sub.6 of FIG. 2) constructed in accordance with an implementation of the present invention. In general, with respect to the sender subsystem 204.sub.1, there is an outgoing queue for sending data and an incoming queue for receiving acknowledgements. With respect to the receiver subsystem 206.sub.6, there is an incoming queue for receiving data and an outgoing queue for sending acknowledgements. Each queue accepts and accumulates data in a rapid manner, which facilitates the data's later transmission or its transferring in bulk. Data may be provided to the sender in one or more submissions, accumulated by the sender, rearranged per destination, and thus sent out in a batch to each destination and accordingly received.

As represented in FIG. 3 by the circled numerals one (1) and two (2), data such as in the form of transmission items (e.g., 310.sub.1-310.sub.2) can be added to a current transmission item (outgoing) buffer 312 by a data generator 314, which may include essentially any thread in an appropriate process. To this end, the outgoing queue conceptually comprises a transmission item tracking component 316 (e.g., in a send thread) of the send subsystem 204.sub.1, which maintains an active tracking element 318.sub.1 comprising a list (e.g. array) of items to transmit, and, at a later time as described below, creates and maintains a list (array) of per-destination data items to transmit as grouped according to their destinations. As described above, the transmission item buffer 312 holds the transmission items (e.g., 310.sub.1 and 310.sub.2).

Figure 4:
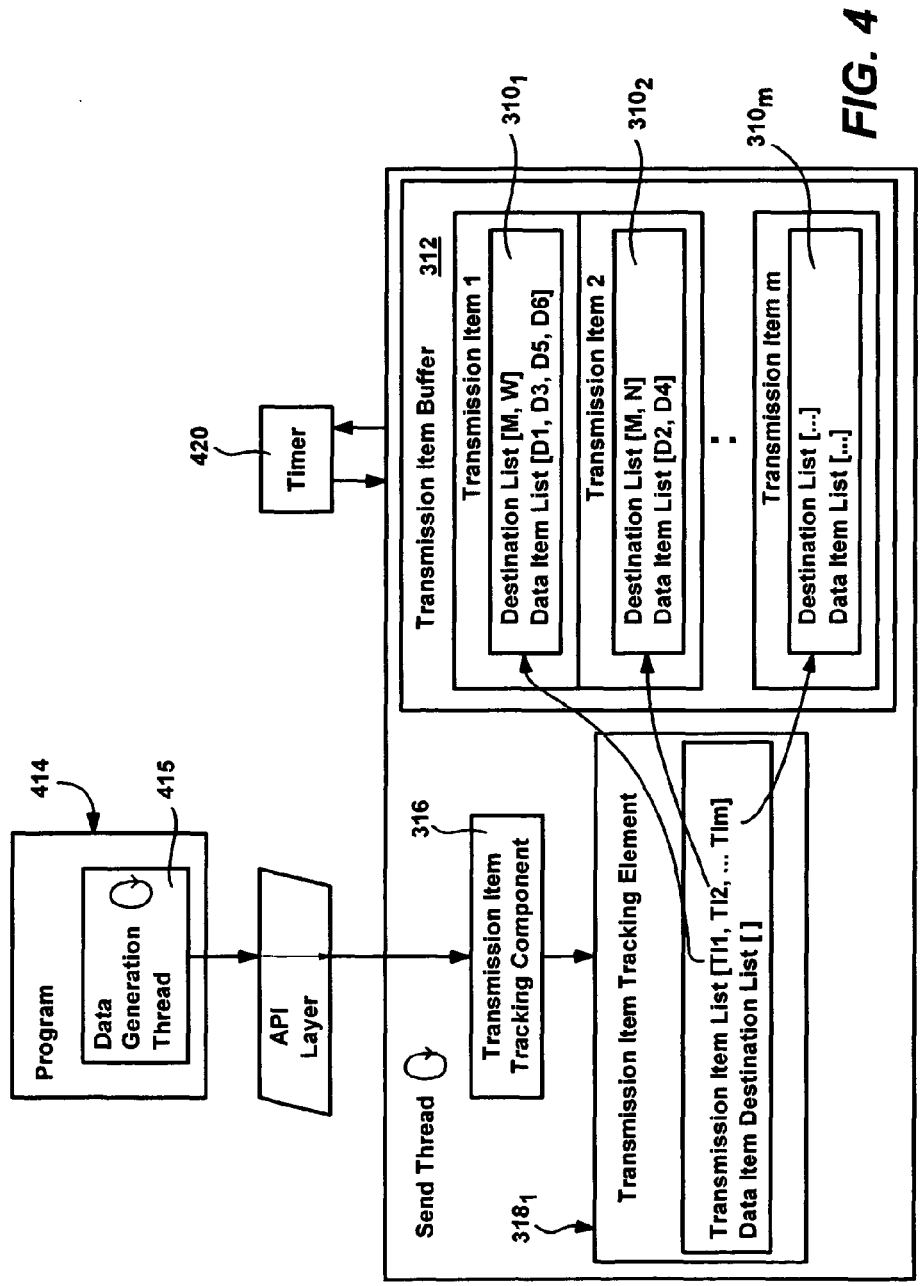
FIG. 4 is a block diagram generally representing components for sending data in accordance with an aspect of the present invention.

More particularly, FIG. 4 represents an example implementation showing the submission and handling of transmission items (e.g., 310.sub.1 and 310.sub.2) in more detail. The data generator (314 of FIG. 3) such as in the form of an application program 414 running a process executing a data generation thread 415 calls the send subsystem 204.sub.1 with a send request, such as via an API layer. The send request includes data in the form of a transmission item (e.g., 310.sub.1) submitted to the transmission item tracking component 316. In this example implementation, each transmission item 310.sub.1-310.sub.m comprises a list of one or more destinations, along with a list of one or more data items. Each data item in turn comprises a self-describing structure that knows about its corresponding data set (or sets) and its size (or sizes), e.g., for each set of data, the data item has a pointer to a buffer location (e.g., 311.sub.1a) containing the data to transmit and a size value. Note that in addition to a single transmission item being able to specify multiple destinations and multiple sets of data, more than one transmission item can be submitted on a single call.

As represented in FIG. 4, and in FIG. 3 by the circled numeral two (2), as transmission items (e.g., 310.sub.1-310.sub.2) are submitted, they are tracked via a transmission item list of the currently active transmission item tracking element 318.sub.1; (note that the data item destination list is not used at this point). More particularly, as represented in FIG. 4, as the data items are received, the transmission item tracking component 316 adds an entry (e.g., offset pointers TI1, TI2 . . . TIm) for each transmission item to its tracking list, and places (e.g., copies) the transmission item (e.g., 310.sub.m) into the transmission item buffer 312. By way of example, as represented in FIG. 4, the transmission item 310.sub.1 indicates that the four items of data identified therein (D1, D3, D5 and D6) are to be sent to three destinations, identified in this simplified example as machines M, N and W. As described above, each data item (D1, D3, D5 and D6) includes a location of the data and a size value.

Figure 5:
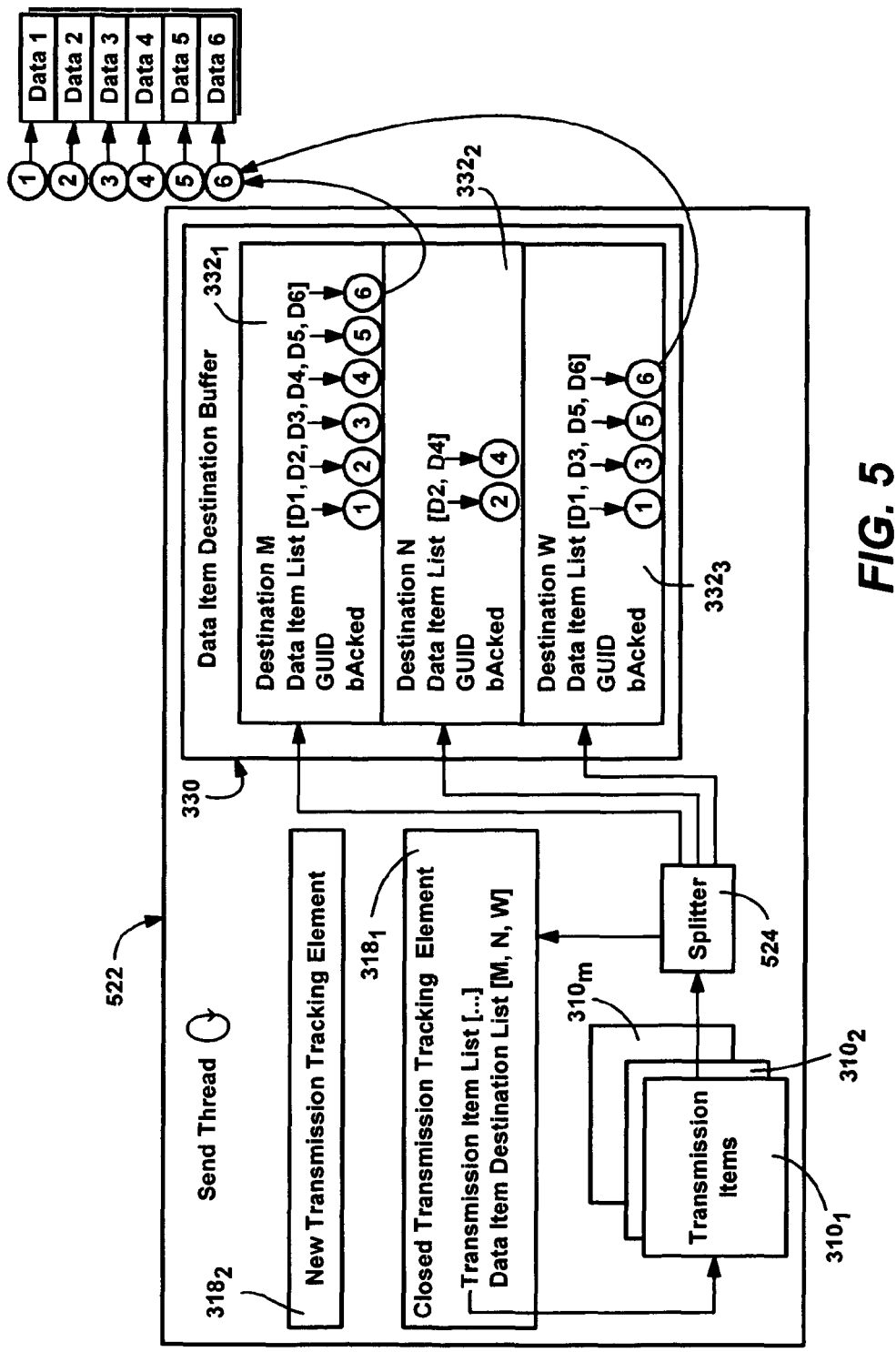
FIG. 5 is a block diagram generally representing components for accumulating data to send as the data is submitted, in accordance with an aspect of the present invention.

In general, the tracking element 318.sub.1 comprises a dynamic list that is active while being loaded, and is closed while the data is being processed for transmission. As represented in FIG. 5, each time a tracking element is closed, a new tracking element 318.sub.2 is started, such that there is always an active transmission item tracking list to track submitted transmission items. There may be one or more closed tracking lists tracking data currently being transmitted.

The transmission tracking element 318.sub.1 is closed when triggered by some event, such as a configurable timer 420 indicating a time limit has been reached, the summed sizes of the data to transmit reaching a size threshold, a high-priority flag or the like, accompanying the data, or some other event, for example an event indicating that whatever data is buffered should be sent right away because the application program or computer system is shutting down. Other priorities are also possible, e.g., send without queuing, put into a different (e.g., low-priority) queue that is only sent when there is not a backup, and so forth. Note that with respect to the timer, there are many equivalent ways to time an event, e.g., register with an event timer, compare a starting timestamp with a current timestamp, and so on, and the present invention can use virtually any such timing mechanism.

As represented in FIG. 5, and corresponding to the circled numeral three (3) in FIG. 3, upon such a trigger event, the active transmission item tracking element 318.sub.1 is closed off from accepting further transmission items, and a new tracking element 318.sub.2 is started that will accept subsequent transmission requests. At this time, the tracking component 316 (e.g., a send thread 522) now uses the closed tracking element 318.sub.1 to create the data item destination list part of the tracking element 318.sub.1. As represented in FIG. 5, the creation of the data item destination list essentially works by splitting the transmission items' data into per-destination data items. To this end, a sort process or the like, represented in FIG. 5 by a splitter 524, groups the data items by destination into a data item destination buffer 330 containing per-destination grouped data items, e.g., 332.sub.1-332.sub.3. Such processes are well known, and virtually any suitable one can be used, e.g., select a transmission item, and for each destination identified therein, perform a union of the listed data items with any other previously established data items for that destination, and repeat for each transmission item. Thus, in the example represented in FIG. 5, after splitting, based on the transmission items 310.sub.1 and 310.sub.2 in FIG. 4 (and no others), the destination M is to receive data corresponding to data items D1, D2, D3, D4, D5 and D6, the destination N is to receive data corresponding to data items D2 and D4, and the destination W is to receive data corresponding to data items D1, D3, D5 and D6. Note that in FIG. 5, the curved arrows represent one such correspondence between data item six (6) and the set of data six (6) to transmit; it is understood that although similar curved arrows are not shown for the other data items to their corresponding data, like correspondences exist.

In keeping with the present invention, for tracking purposes, a GUID is assigned to each per-destination data item corresponding to a transmission, which as described below will be used later to correlate the transmitted data item (and data) with its returned acknowledgement (ACK). For example, this allows the data item (and the data itself) to be freed up, once the data has been acknowledged as received, e.g., an ACK with that GUID has been returned.

Figure 6:
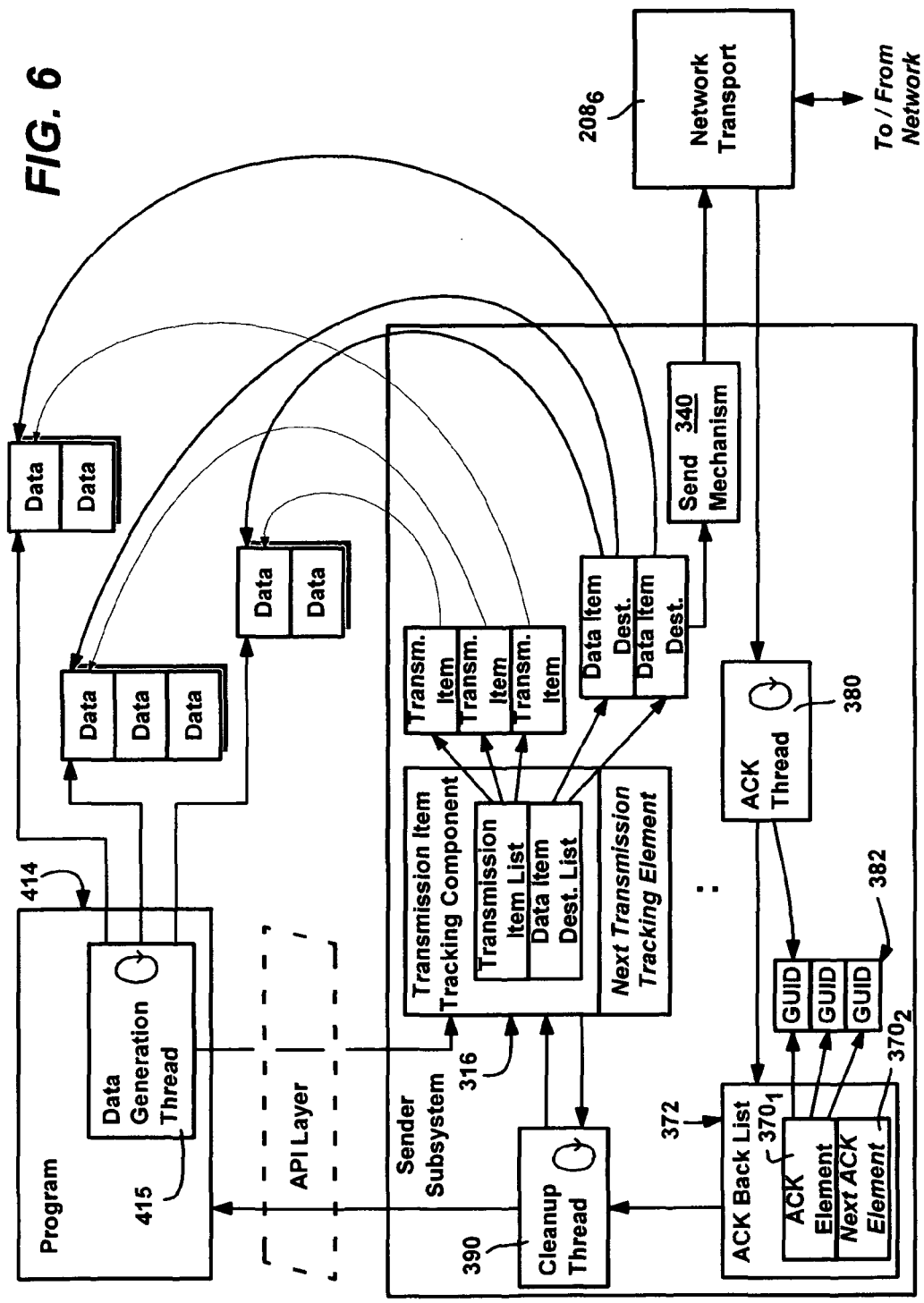
FIG. 6 is a block diagram generally representing components for rearranging the data to send by destination, in accordance with an aspect of the present invention.

As represented in FIGS. 3 and 6, once the per-destination splitting has been performed, the data for each destination is batched and sent out by a send mechanism 340 of the send thread 522 to the network transport 208.sub.1, that is, on the socket. Note that in one preferred implementation, because the send mechanism 340 runs on a separate send thread (which may also handle the pre-transmission processing such as the splitting operation described above) to perform the data transmission, the data transfer is asynchronous, and non-blocking The send mechanism's sending of the data in the data item destination buffer 330 is represented in FIG. 3 by the circled numeral four (4). In addition to sending the data, the send mechanism 340 wraps the (batched) data in a message protocol that for each destination, includes the GUID for the data item and information that allows the receiver to unwrap the data into corresponding data items.

As represented in FIG. 3 by the circled letter A, a receive mechanism (e.g., a separate thread) 350 of the receiver subsystem 206.sub.6 receives the data off the socket, and places the data in a currently active receiving element 352.sub.1 of a receive list 354. Preferably, as represented in FIG. 7, the receive mechanism 350 comprises a separate receive thread so that the received data is immediately placed in the active receiving element 352.sub.1 of a receive list 354.

It should be noted that many other senders may be sending to the receiver subsystem, and each sender may be sending multiple times to the same receiver. Thus, as described above, each received message needs to be tracked by its originating sender, or origin, as well as by the GUID that was generated at the sender (when the transmission items were split into the per-destination data items). To track the received data, the origin and GUID are maintained in one list 360, while the data (e.g., buffer pointer and size) is maintained in a parallel list 362.

Figure 7:
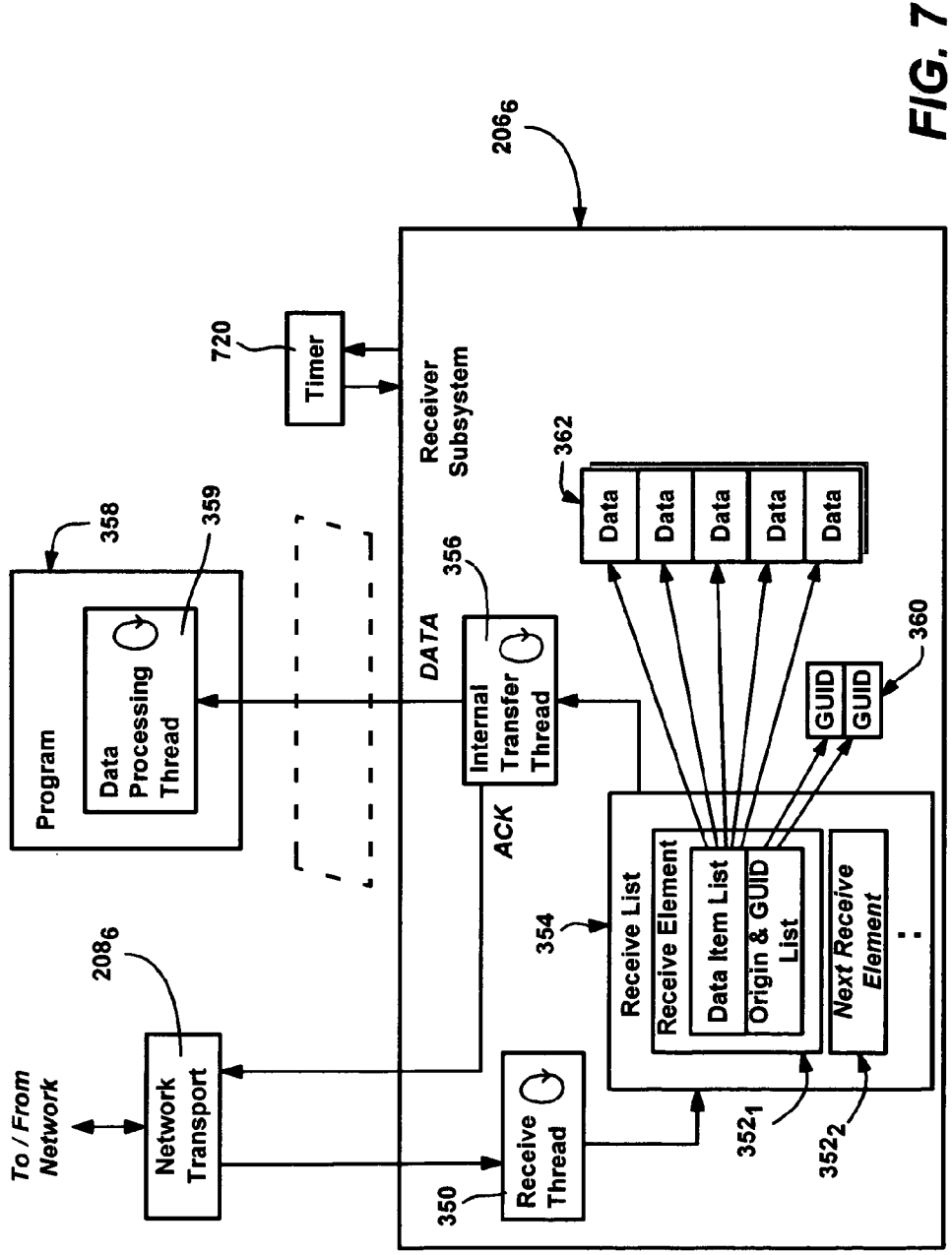
FIG. 7 is a block diagram generally representing components for receiving and handling received data in accordance with an aspect of the present invention.

As represented in FIG. 7 (and corresponding to the circled letter B in FIG. 3), once a configurable amount of time has passed (or other mechanism) such as kept by another timer 720, the current receive list element 352.sub.1 is closed off and a new one 352.sub.2 is started. When closed off, the listed data items are passed by an internal transfer thread 356 to the appropriate recipient application program 358 for processing by its own thread 359, and acknowledgements (ACKS) for each received transmission (e.g., per origin, GUID) are sent back to their destination origins, such as in a set of GUIDS. Note that like the original transmissions, the acknowledgements (GUIDs) may be split and batched according to their origins by the internal transfer thread 356.

Returning to FIG. 6, (and corresponding to the circled numeral five (5) in FIG. 3), when an acknowledgement is sent back and received, each acknowledgement's GUID is placed by an ACK handler (e.g., a separate thread) 380 in a queue (such as an active element 370.sub.1 of an ACK back list 372) for later processing. Upon an event such as a configurable time limit being reached, or size (and/or number of ACKs) limit being reached, or some other event such as a higher priority ACK being detected, application or system shutdown being detected and so on, the current active acknowledgement list element 370.sub.1 is closed off and a new acknowledgement list element 370.sub.2 started. A cleanup mechanism, such as running as a separate cleanup thread 390, uses the closed off ACK back list element 370.sub.1 to search back into the transmission tracking element's data structures, generally to mark transmissions as successfully sent, and/or free up the data structures. The cleanup thread 390 also may return to the application program 414 to indicate the successful transmission, whereby the program may free up its data. Any data that is not marked as acknowledged in the tracking component's data structures are subject to re-sending after a configurable amount of time, and/or to be garbage collected.

Figure 8:
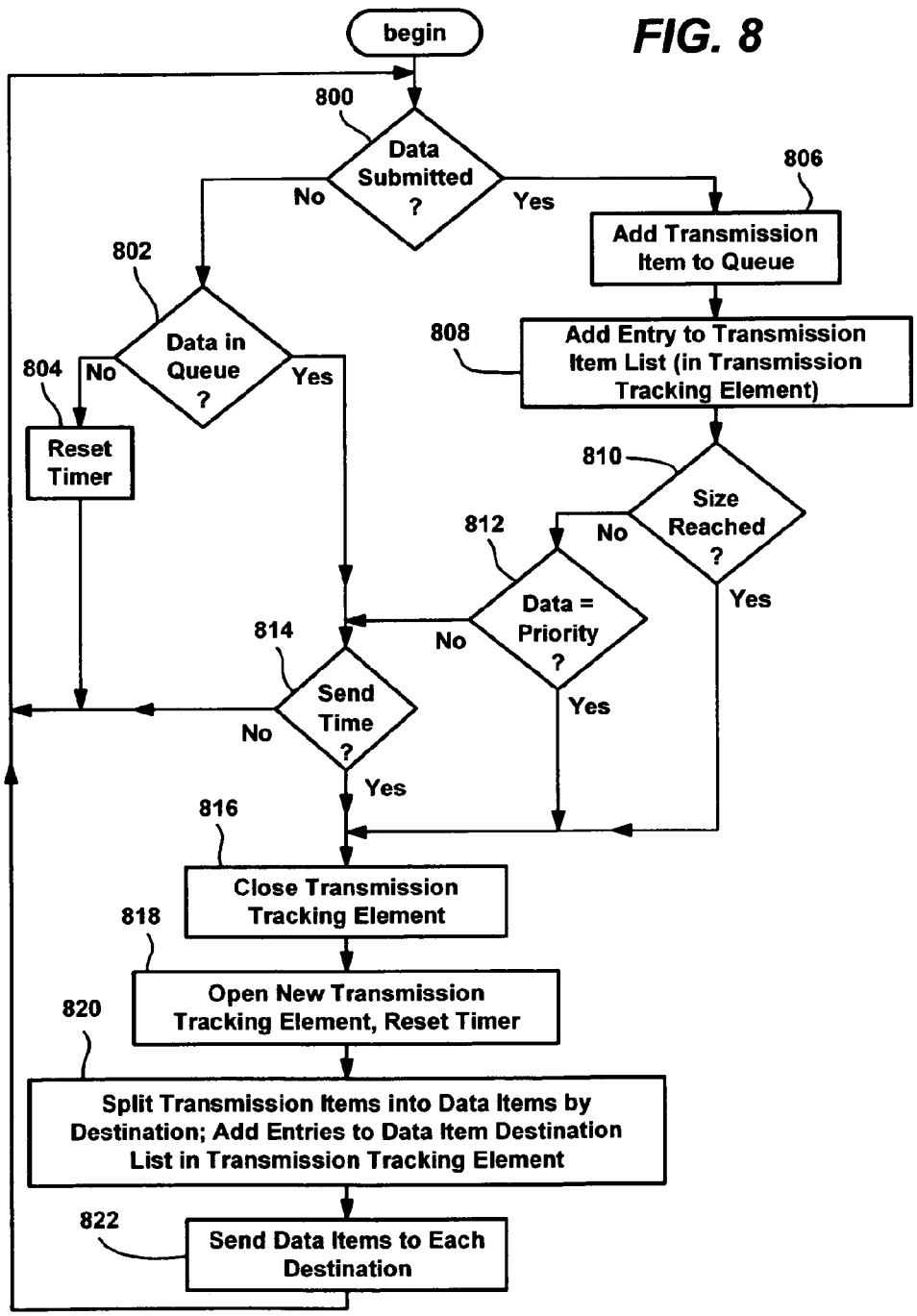
FIG. 8 is a flow diagram generally representing a process for accumulating, arranging and transmitting data in accordance with an aspect of the present invention.
Figure 9:
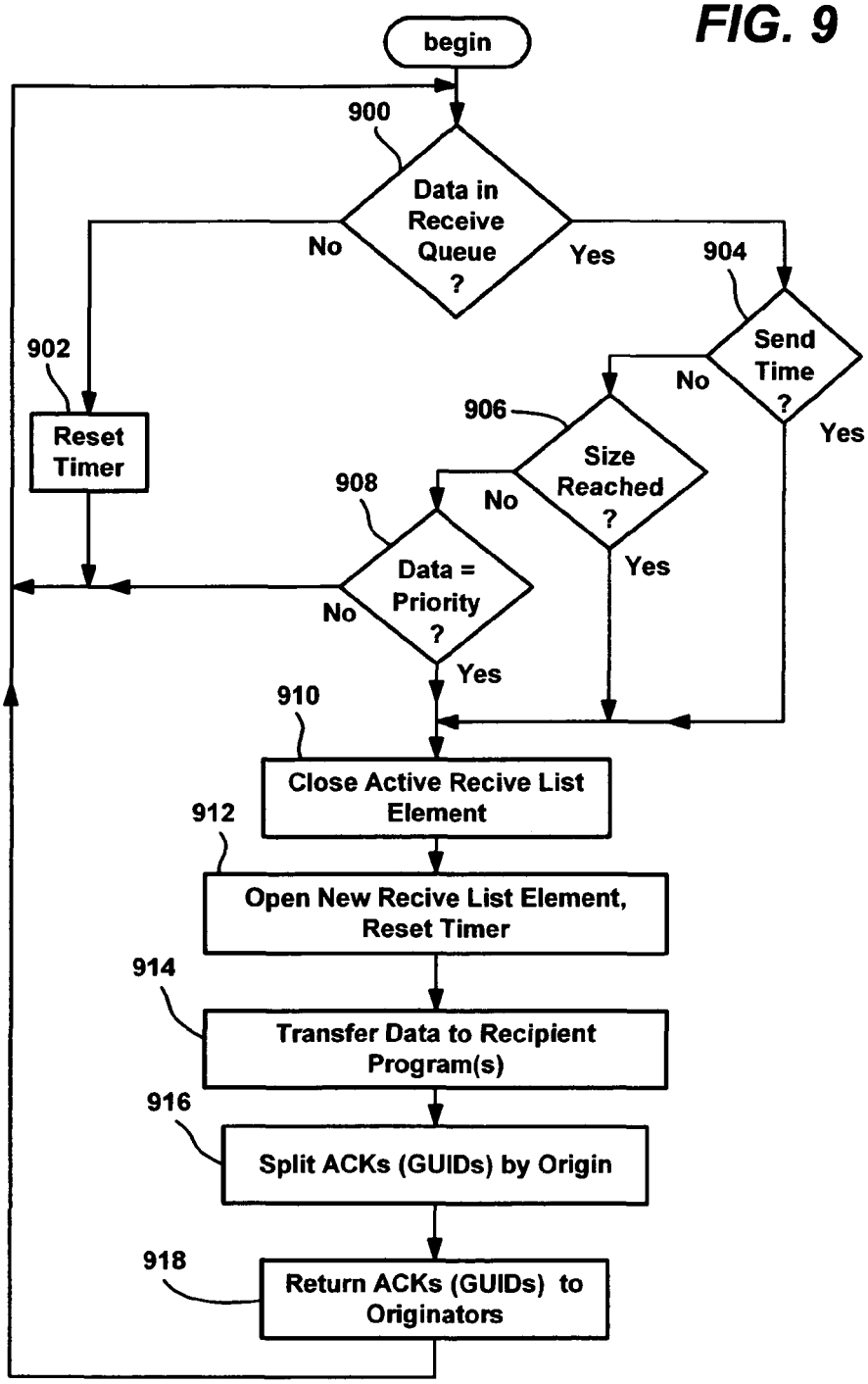
FIG. 9 is a flow diagram generally representing a process for handling received data in accordance with an aspect of the present invention.
Figure 10:
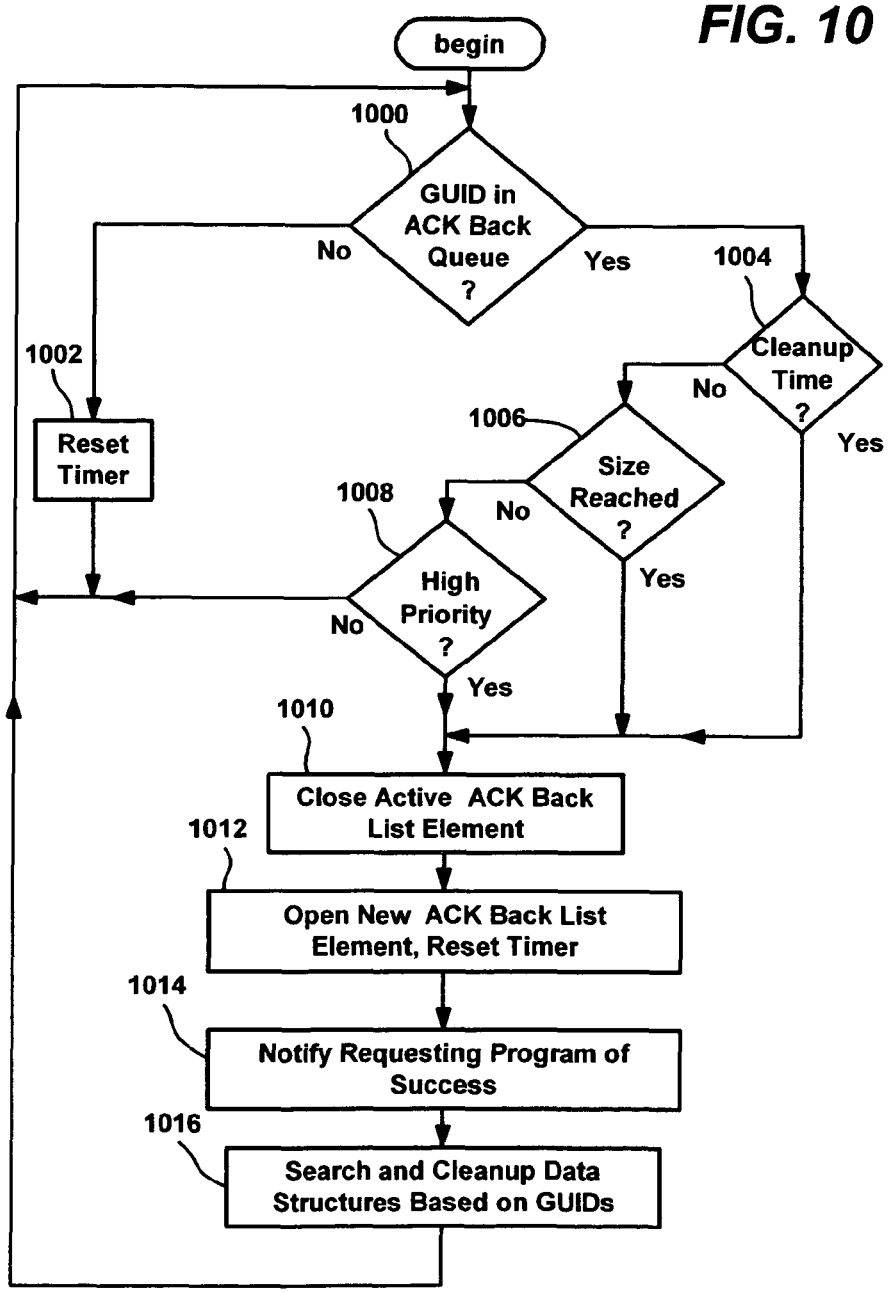
FIG. 10 is a flow diagram generally representing a process for handling received acknowledgements in accordance with an aspect of the present invention.

Turning to an explanation of the operation of the present invention with particular reference to the flow diagrams of FIGS. 8-10, step 800 of FIG. 8 represents testing for whether data to transmit (e.g., a transmission item) has been submitted. If not, step 800 branches to step 802, which resets the timer at step 804 if no data has yet been queued, e.g., so that the timer does not attempt to trigger a send when there is no data to send. Step 804 loops back to step 800 to await data. If there is some data in the queue at step 802, step 802 instead branches ahead to step 814 to determine whether it is time to send that data. If not, step 814 loops back to step 800 to handle more data and/or trigger the send. Note that at least some of the steps of FIG. 8 may be event driven rather than operate in a loop, however a loop is shown in the example for purposes of clarity.

Returning to step 800, if a new transmission item is submitted for queuing, step 800 instead branches to step 806, where the transmission item is queued in the transmission item buffer. Step 808 adds an entry to the transmission item list in the active transmission tracking element. Step 810 then tests for whether the size limit has been reached, and if so, branches ahead to step 816 to process the transmission items for sending, as described above. If not, other tests may be performed, e.g., step 812 represents a test as to whether the data indicates a high-priority item, whereby the data would be sent right away. Other tests such as an external event are not represented in FIG. 8 for purposes of simplicity.

Eventually, whether by size at step 810, by priority at step 812, by time at step 814 or by some other event, the "send" trigger is achieved, and the process reaches step 816. Step 816 represents the closing of the active transmission tracking element, with step 818 representing the opening of the new transmission tracking element and the resetting of the timer. Subsequent transmission requests will go into that new active element, until it is likewise closed and a new one opened at the next triggered send.

Step 820 represents the creation of the data item destination list, accomplished by splitting the transmission items into data items by their destinations, and adding entries to the data item destination list. Once split, step 820 sends the data to each destination. The process then loops back to step 800, where the new active transmission element is used. Note that the filling may be via a separate thread, or the send thread can handle both the sending and filling of the queue.

Turning to an explanation of how received data is handled once placed in the receive list, it will be understood that the internal data transfer including the sending of acknowledgements essentially may follow the same queuing and batching logic as that of FIG. 8, except that ACKs including GUIDs are extracted from the transmissions and queued, rather than transmission items being submitted and handled. Thus, FIG. 9 will generally follow most of FIG. 8, except that FIG. 8 shows the buffer being filled (by some thread, not necessarily the send thread), while FIG. 9 is premised on a separate receive thread having filling the receive list as data is received.

Step 900 of FIG. 9 tests for whether there is any data in the receive queue, and if not, resets the timer at step 902, until some data is detected. If there is data, steps 904 is instead executed, which represents testing for whether it is time to handle the queued data and GUIDs, and if not, branching to step 906 to test for a size (and/or GUID quantity) limit having been reached. Step 908 represents testing whether any of the data was high-priority data, for example, in which case the data should be handled (dequeued and receipt acknowledged) without delay. Note that the time limits and sizes may be very different for received data, e.g., as a machine may send many more transmissions than it receives, or vice-versa.

When triggered, whether by time at step 904, by size at step 906, by priority at step 908, or by some other event, the process reaches step 910. Step 910 represents the closing of the receive list element, with step 912 representing the opening of the new receive list element and the resetting of the timer. Step 914 represents transferring the data (e.g., buffer pointers and sizes) to the recipient program or programs. Step 916 represents splitting the acknowledgements (GUIDS) by their source, and returning them to their corresponding originators.

FIG. 10 represents the logic for handling the acknowledgements via the cleanup thread, beginning at step 1000 of FIG. 10 which tests for whether there is any data in the active ACK back list element. If not, the process thread resets the timer at step 1002, until at least one GUID is detected. If there is a GUID, step 1004 is instead executed, which represents testing for whether it is time to handle the GUIDs, and if not, branching to step 1006 to test for a size (and/or GUID quantity) limit having been reached. Step 1008 represents testing whether any of the acknowledgements are marked high-priority, for example, in which case the GUID queue should be handled (e.g., the application notified of success) without delay.

When triggered, whether by time at step 1004, by size/quantity at step 1006, by priority at step 1008, or by some other event, the process reaches step 1010. Step 1010 represents the closing of the ACK back list element, with step 1012 representing the opening of the new ACK back list element and the resetting of the timer. Step 1014 represents notifying the program (or programs) of the successful receipt of their transmission request, while step 1016 represents using the GUIDs to search the transmission tracking element data structures so as to handle their acknowledgment and free them up when no longer needed. For example, the per-destination data item can be freed once its GUID was returned, however, the transmission item (which may specify multiple recipients) cannot be freed until each recipient has acknowledged the receipt of the data.

It should be noted that the various timers, sizes, priorities and so forth may be adjusted for each thread to tune the network machines as desired. The tuning may be for many machines or all machines in the network, or per machine, e.g., certain machines that send a lot of data may be given larger maximum sizes and/or longer accumulation times. Further, the tuning may be dynamic by communication from another machine, e.g., so as to throttle a machine that is sending too many transmissions.

As can be seen from the foregoing detailed description, there is provided a method and system for handling the transmission of data in a non-blocking manner, with asynchronous notifications returned to the senders to acknowledge that the data was successfully received. In general, by queuing and then intelligently batching the transmissions into a lesser number of combined data transmissions, the present invention scales to large numbers of networked machines. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computing system comprising:
    at least one processor; and
    one or more storage device having stored computer executable instructions which, when executed by the at least one processor, implement a method that includes the following:
        accumulating a plurality of transmission items to send, each transmission item specifying at least one destination machine and at least one set of data to send to each destination machine, wherein the plurality of transmission items include two or more transmission items that specify different destination machines to which they are to be sent, wherein the accumulated transmission items are tracked in a transmission item list;
        detecting a send trigger event, and in response, closing the transmission item list and grouping the transmission items in the transmission item list into per-destination data items such that the transmission items are grouped based on the destination machine to which they are to be sent, each per-destination data item identifying a particular destination machine and each set of data to send to the particular destination machine;
        associating a unique identifier with each per-destination data item; and
        sending a transmission for each per-destination data item to the destination machine identified in that per-destination data item, the transmission comprising the unique identifier associated with that per-destination data item and each set of data corresponding to that per-destination data item.

2. The computing system recited in claim 1, wherein the method further includes detecting a send trigger event, and in response, closing the transmission item list.

3. The computing system recited in claim 2, wherein the method further includes creating a new transmission item list for receiving transmission items that are submitted after the send trigger event is detected.

4. The computing system recited in claim 1, wherein the method further includes receiving an acknowledgement from each destination machine that received the transmission sent thereto, the acknowledgment comprising the unique identifier.

5. The computing system of claim 1, wherein the method further includes receiving at least two transmission items in a single call from a data generator.

6. The computing system of claim 1, wherein detecting the send trigger event includes testing for the send trigger event, and wherein testing for the send trigger event comprises a) determining whether a time limit is reached, b) determining whether a threshold amount of data is achieved or c) determining whether a transmission item indicates that at least part of its corresponding data comprises high-priority data, or any combination of a), b) or c) or a), b) and c).

7. The computing system of claim 1, wherein the method further includes placing data corresponding to returned acknowledgements into an acknowledgement data structure, and accessing the acknowledgement data structure to determine which per-destination data items have been successfully received by a destination.

8. The computing system of claim 7, wherein the method further includes locating a unique identifier corresponding to a selected acknowledgement in the acknowledgement data structure, freeing data based on the unique identifier, tracking the acknowledgements in the acknowledgement data structure, closing the acknowledgement data structure on a cleanup trigger event, and providing a new acknowledgement data structure for tracking subsequently returned acknowledgements.

9. The computing system of claim 8, wherein the method further includes detecting the cleanup trigger event upon a time limit being reached, a threshold amount of data being achieved, or a priority level being detected, or any combination of a time limit being reached, a threshold amount of data being achieved, or a priority level being detected.

10. The computing system of claim 1, wherein the method further includes, at a specified destination machine, receiving a data transmission from the sender and placing information corresponding to the transmission into a receive data structure.

11. The computing system of claim 1, wherein the computing system further comprises a data item destination buffer and wherein the system maintains the per-destination data items in the data item destination buffer.

12. The computing system of claim 1, wherein the computing system is a distributed computing system.

* * * * *